US005616095A

United States Patent [19]

Pruitt

[11] Patent Number: 5,616,095
[45] Date of Patent: Apr. 1, 1997

[54] FORCE MULTIPLIER TOOL

[76] Inventor: Charles D. Pruitt, 2320 Pruitt La., Millstadt, Ill. 62260

[21] Appl. No.: 500,456

[22] Filed: Jul. 10, 1995

[51] Int. Cl.$^6$ ........................................................ F16H 1/32
[52] U.S. Cl. ........................................ 475/178; 81/57.31
[58] Field of Search ................................ 81/57.31, 57.42; 475/178

[56] References Cited

U.S. PATENT DOCUMENTS

| 3,861,244 | 1/1975 | MacDonald | 81/57.31 |
| 5,123,308 | 6/1992 | Shaffer | 81/57.31 |
| 5,176,047 | 1/1993 | Bai et al. | 81/57.31 |
| 5,178,046 | 1/1993 | Matsumoto et al. | 475/178 |
| 5,472,384 | 12/1995 | Haga | 475/178 |

FOREIGN PATENT DOCUMENTS

| 566727 | 7/1977 | U.S.S.R. | 81/57.31 |

OTHER PUBLICATIONS

Photographs of a scale model of a planocentric hypocycloidal gear manufactured by Ferguson Machine Company in existence at least as early as 1968.

Chironis, Nicholas P., *Gear Design and Application*, Chapter 3, "Planetary Gear Systems" by John H. Glover, McGraw–Hill Book Co., New York, New York, 1967.

Lynwander, Peter, *Gear Drive Systems Design and Application*, Marcel Decker Inc., New York, New York, 1983, pp. 6–11, 293–323.

Chironis, Nicholas P., *Mechanisms & Mechanical Devices Sourcebook*, Chapter 6 Subsection, "Planetary Gear Systems" by John H. Glover, McGraw–Hill Book Co., New York, New York, 1991, pp. 268–274.

Buckingham, *Analytical Mechanics of Gears*, Dover Publications, New York, New York, 1949 (approx.), pp. 25–29.

Walter Company catalog, Mar., 1987.

Ferguson publication BF–100, date unknown, but earlier than 1990.

Ferguson bulletin PT–67, date unknown, but earlier than 1990.

Ferguson catalog 764, date unknown, but earlier than 1990.

Norbar catalog, Jan., 1991.

Sumitomo Transmission Gear Division catalog, date unknown, but earlier than 1993.

*Primary Examiner*—Dirk Wright

[57] ABSTRACT

The force multiplier tool comprises a planocentric hypocycloidal gearing mechanism adapted for hand tool use. Specifically, the tool comprises a ring gear, a first and a second pinion gear disposed inside said ting gear and revolving about an input eccentric shaft, a plurality of drive pins, and an input shaft and an output shaft. The input eccentric shaft provides a camming action which force the pinions to revolve within the ring gear in a planocentric hypocycloidal path, said first and second pinion gears being separated in frequency by one hundred and eighty degrees. The pinion gears have a plurality of drive holes having diameters larger than the diameter of the drive pins such that when the pinion gears are rotating, the drive pins turn the output shaft. Importantly, the second pinion gear may be omitted and the number of drive pins and drive holes reduced to one while still allowing the tool to operate, although the use of two pinions provides better dynamic balance and continuous driving.

12 Claims, 3 Drawing Sheets

FORCE MULTIPLIER TOOL

BACKGROUND OF THE INVENTION

1. Field of the Invention

This invention relates to tools which multiply force and, more specifically, to a hand tool which multiplies force by using planocentric hypocycloidal gearing.

2. Related Art

Hand tools which multiply torque are well known. Eight companies worldwide are known to manufacture such devices: Antveks in Russia; Norbar in England; Mito in Japan; Juwel and Walter in Germany; and Geartronics, Central, and Sweeney in the United States.

These companies all utilize a planetary gear design to effect torque multiplication because planetary designs are more compact, and offer significant envelope and weight savings over the single load path of a simple gear mesh. A planetary gearbox transmits power through two or more load paths rather than a single load path characterized by a simple gear mesh. Significantly, none of these companies utilize an planocentric hypocycloidal gear design.

It is well known that planetary gearing is an efficient method of achieving high reduction ratios in minimum space. As shown by Lynwander in *Gear Drive Systems Design and Application,* Marcel Decker Inc., New York, N.Y., 1983, pp. 6–11, 293–323, the multiple load path of planetary gearing divides the horsepower transmitted among several planet gear meshes and allows the gear size to be reduced significantly compared to parallel shaft designs. In addition, planetary stages can be linked together to achieve high ratios by having the first-stage planet carrier drive the second-stage sun gear and the second-stage carrier drive the third-stage sun gear, etc.

In general, the prior art has established that when high gear ratios (over 15:1) are required, planetary gear systems tend to be more economical, even in relatively small quantities. Lynwander at p. 323. This is because the reduced size of planetary components offset the cost of additional parts in terms of material and the advantages of handling and machining smaller components. For example, using a hardened, ground, helical, parallel shaft gear and using a pinion pitch diameter of 4 inches, a gear pitch diameter of 16 inches, a face width of 4 inches, would require a gearbox envelope of 24×12×12 inches, and would weigh approximately 650 pounds. However, the equivalent planetary gear set would have a sun gear pitch diameter of 3.5 inches, ring pitch diameter of 10.5 inches, a planet pitch diameter of 3.5 inches, a face width of 3 inches a gearbox envelope of 15 inches in diameter×10 inches in length, and would weigh approximately 250 pounds.

The known torque multiplier hand tools :clearly weigh substantially less than the example provided above, as hand tools present fundamentally different size and weight requirements. The Walter Company in Germany provides a torque multiplier of planetary design yielding a 36:1 gear ratio at a weight of approximately 66 pounds (see March, 1987, Walter Company catalog, at p. 10). Achieving the higher ratios, and thus higher torque multiplication, often requires the manufacture and assembly of approximately 41 parts (see March, 1987 Walter Company catalog at p. 12).

Therefore, in the hand tool art, any reduction of the number of parts required for manufacture and assembly, and any reduction of weight would be highly advantageous and significant in terms of material and labor costs. However, a hand tool which achieves a gear ratio of 30:1 in a single stage of reduction and which reduces the total number of parts and weight by at least 50 percent over the torque multiplier hand tools currently employing the planetary gear system is thought to be impossible. Such a hand tool would have an immediate number of applications ;previously not possible due to the reduction in size and would greatly increase the ease with which one person can apply the tool, thereby allowing persons not otherwise able to manipulate larger tools to use the same.

The Ferguson Machine Company has manufactured what is known in the art as the Ferguson Hi-Range speed reducer which comprises two or more pinions driven eccentrically within a stationary ring gear driven either by an eccentric cam on an input shaft or by a cam type input shaft. Power is transmitted when the pinion gears, having drive pin holes, are driven around the stationary ring gear, thereby transferring power to drive pins disposed in the drive pin holes, and thereby rotating and driving an output shaft connected to the drive pins. The drive pin holes in the pinion gears are larger in diameter than the drive pins to allow eccentric movement of the pinion. The Ferguson Hi-Range speed reducer is capable of achieving reductions of up to 360:1 in a single stage. Two diametrically opposed pinion gears: as opposed to a single pinion gear were commonly employed for improved dynamic balance, although additional pinions may be added for additional stability.

The Ferguson Hi-Range speed reducer was used in association with heavy machinery as demonstrated in Ferguson publication BF-100, bulletin PT-67, and catalog 764, which documents are hereby incorporated by reference in their entirety. The focus and application of the Ferguson Hi-Range speed reducer was to reduce the speed of the input shaft. The Ferguson Hi-Range offers efficiency and ease of fabrication, but is only one of many possible planocentric hypocycloidal configurations.

Heretofore, it is thought that planocentric hypocycloidal force multiplication has not been used in association with hand tools.

SUMMARY OF THE INVENTION

It is in view of the above problems that the present invention was developed. The invention is a force multiplier hand tool utilizing a planocentric hypocycloidal gear design to achieve a reduction in the number of parts and weight of at least fifty percent over that currently employed by planetary gear designs. The term "hand tool" is defined as a tool which operates at input speeds of less than one hundred revolutions per minute under load. The term hypocycloidal motion is commonly defined as the path described by a point, on a rolling circle which is tangent internally to a fixed circle, that rolls inside the fixed circle, as defined by Buckingham, *Analytical Mechanics of Gears,* Dover Publications, New York, N.Y., 1949.

The force multiplier tool comprises a ring gear, a first and a second pinion gear disposed inside said ring gear and revolving about an input eccentric shaft, a plurality of drive pins, and an input shaft and an output shaft. The input eccentric shaft provides a camming action which force the pinions to revolve within the ring gear in a planocentric hypocycloidal path, said first and second pinion gears being separated in frequency by one hundred and eighty degrees. The pinion gears have a plurality of drive holes having diameters larger than the diameter of the drive pins such that when the pinion gears are rotating, the drive pins turn the output shaft. Importantly, the second pinion gear may be omitted and the number of drive pins and drive holes reduced to one while still allowing the tool to operate, although the use of two pinions provides better dynamic balance and continuous driving.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION OF THE PREFERRED EMBODIMENTS

Figure 1:
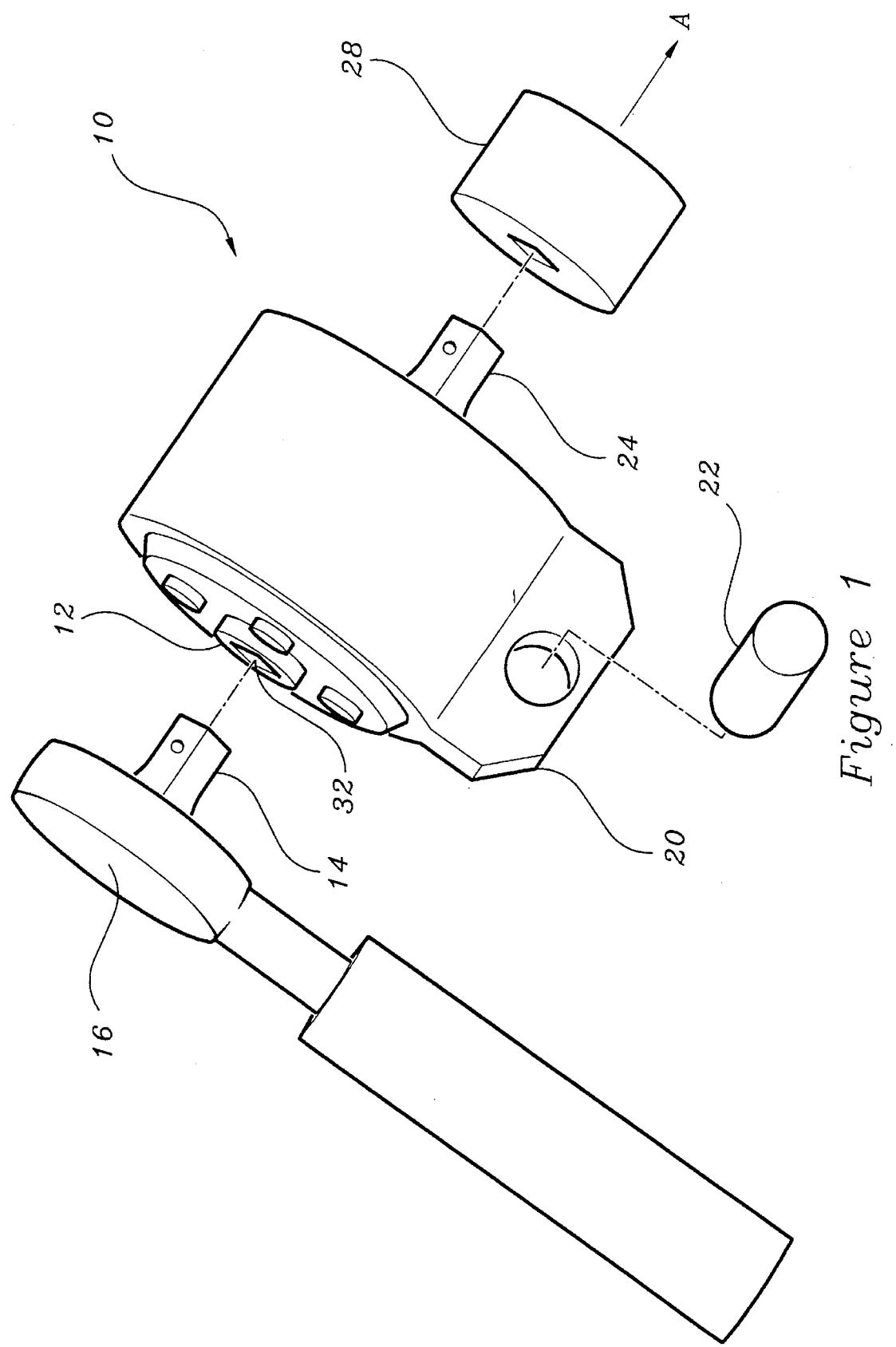
FIG. 1 illustrates an exploded view of one embodiment of the hand tool of the present invention in use.

Referring to the accompanying drawings in which like reference numbers indicate like elements, FIG. 1 illustrates an exploded view of a hand tool, shown generally at 10, of the present invention. Hand tool 10 has an eccentric input shaft 12 adapted to receive a square drive 14 from ratchet wrench 16. Square drive 14 is shown as square in shape, but may also assume any other drive means such as a hex drive (male or female), spline drive (male or female), or any other geometry of drive or connector as the user may deem desirable or that may be found in the art.

Hand tool 10 is also adapted to receive at first end 20 a reaction bar 22. Hand tool 10 also comprises output shaft 24 which is, preferably, a second square drive 26. Output shaft 24 may drive socket 28 which may itself be attached to a fastener indicated at A such as a automobile or truck tire lug nut or a fastener head for some other large machinery such as bulldozers, earth-moving equipment, and the like.

The force multiplier hand tool 10 may range from 5:1 to 360:1 and is designed for strictly low speed applications herein defined as one hundred revolutions per minute or less of eccentric input shaft 12 under load.

In use, ratchet wrench 16 is applied to hand tool 10 by mating male square drive 14 with square hole 32 of eccentric input shaft 12. Reaction bar 22 is then inserted into first end 20 of hand tool 10 with the free end of reaction bar 22 being placed against any immobile object for support. Socket 28 is placed over the object to which force must be applied and output shaft 24 is snapped into socket 28. When the user rotates ratchet wrench 16, the user will experience a force multiplication proportional to the ratio of the gear mechanism of hand tool 10. For example, in a hand tool 10 having a 30:1 ratio, one foot pound of force applied by the user at ratchet wrench 16 will produce thirty foot pounds of force on the object attached to socket 28 such as a lug nut. Consequently, 100 foot pounds of force transmitted to eccentric input shaft 12 would yield 3,000 foot pounds force which output shaft 24 may apply to a fastener given a 30:1 gear ratio.

It is noted that ratchet wrench 16 is shown with a square drive powered manually, but the drive may originate from any other motive force such as an electric drill motor, pneumatic nut runner or ratchet, or hydraulic actuation, etc. which operates at one hundred revolutions per minute or less under load.

Figure 2:
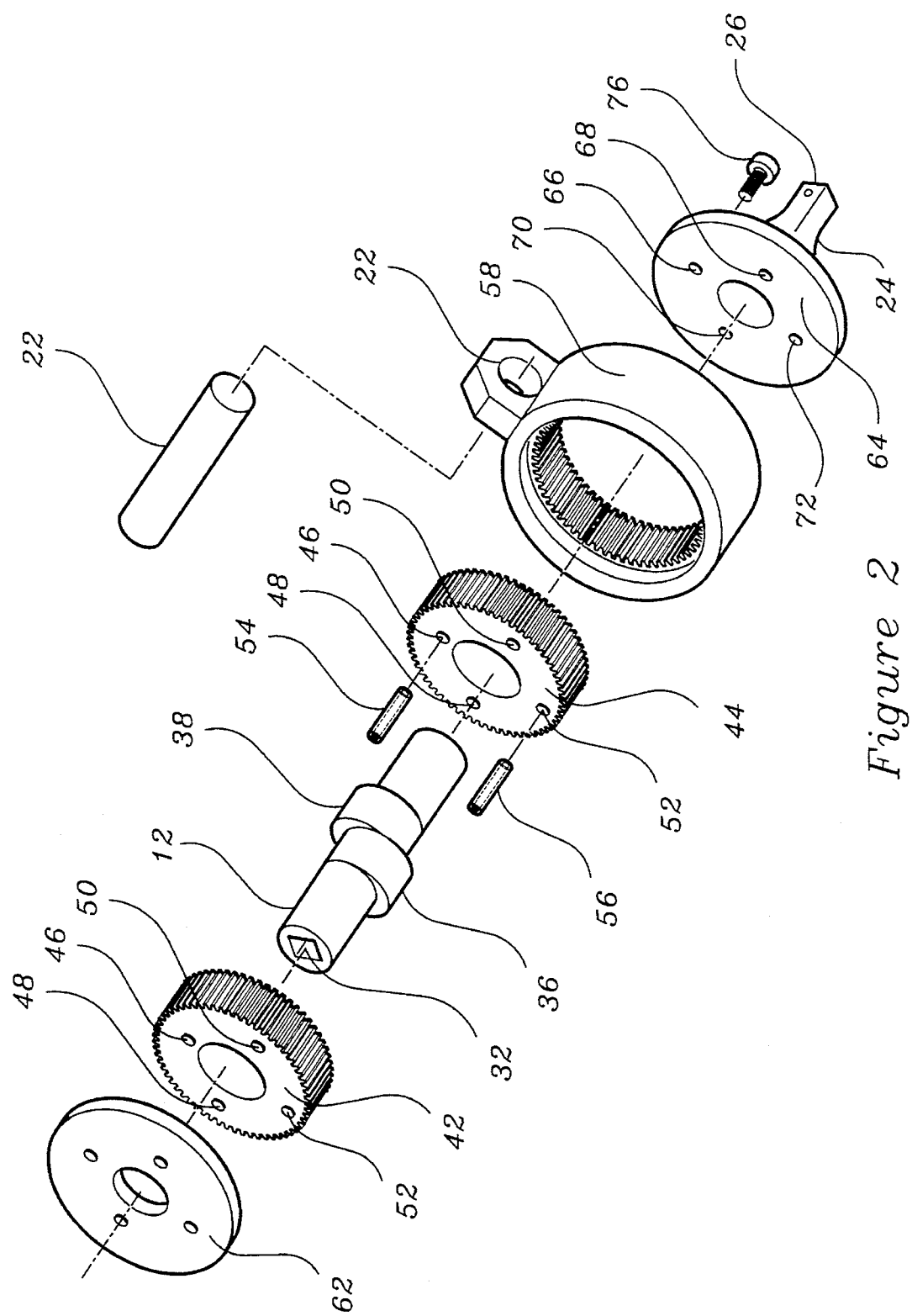
FIG. 2 illustrates an exploded view of the planocentric hypocycloidal gear portion of one embodiment of the present invention.
Figure 3:
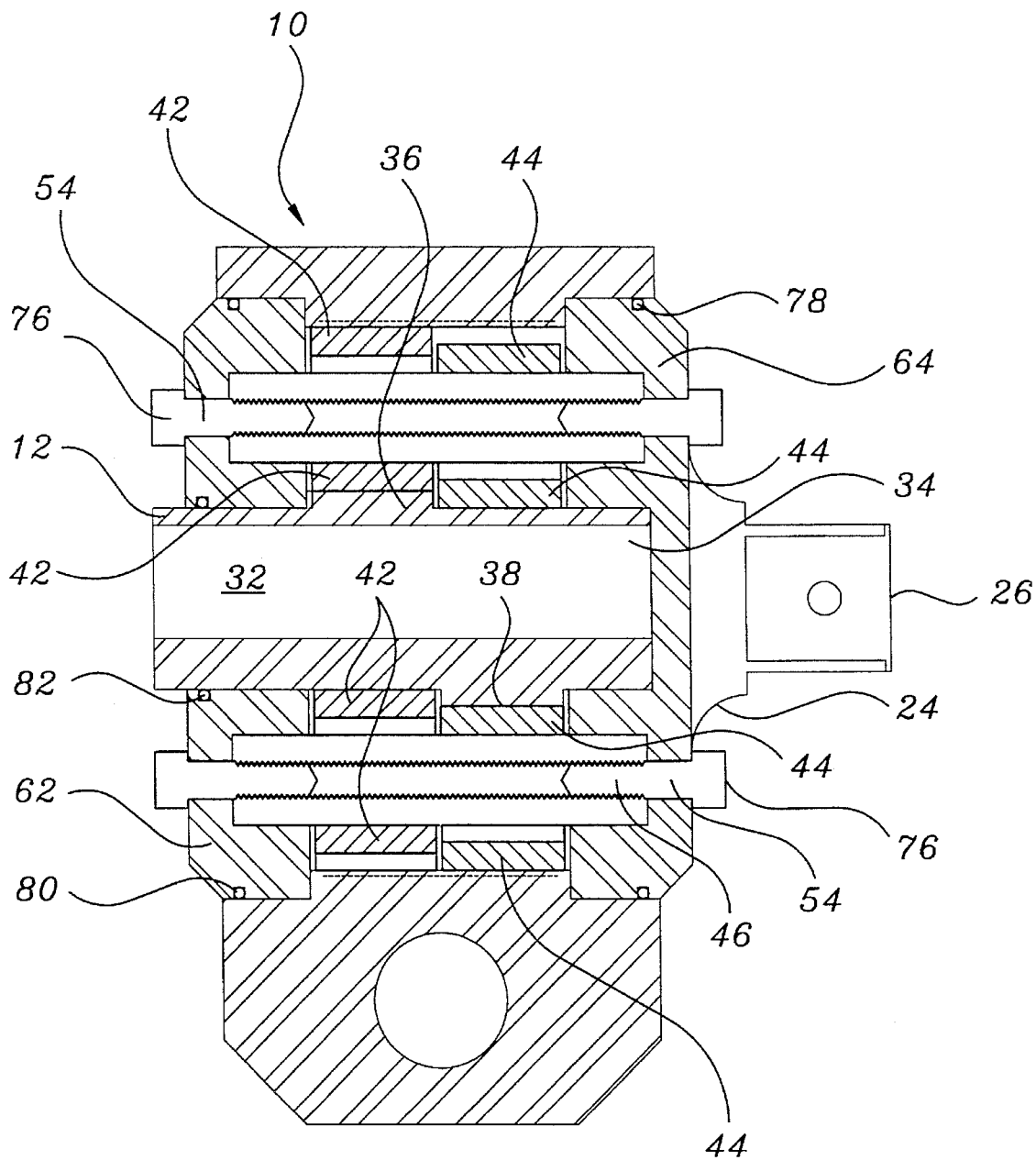
FIG. 3 illustrates a cross-sectional view of the planocentric hypocycloidal gear portion of the embodiment of the present invention shown in FIG. 2.

FIGS. 2 and 3 provide additional information on the construction of hand tool 10. Specifically, it can be seen that eccentric input shaft 12 is adapted to receive square drive 14 at square hole 32. A section of eccentric input shaft 12 is plugged with plug 34 made of plastic to prevent entry of dirt or other foreign material into hand tool 10. Alternatively, female square hole 32 may extend only partially into eccentric input shaft 12, thereby leaving the remainder to eccentric input shaft as solid steel and relieving the necessity for plugging. As can be seen more clearly from FIG. 3, eccentric input shaft 12 is symmetrically stepped at first surface 36 relative to second surface 38.

First pinion 42 is disposed on first surface 36 of eccentric input shaft 12 and second pinion 44 is disposed on second surface 38 of eccentric input shaft 12. First and second pinions 42 and 44 have a plurality of drive holes 46–52 having diameters larger than the diameters than a plurality of drive pins 54 and 56 (remaining two drive pins not shown). First and second pinions 42 and 44 have teeth which engage the teeth of ring gear 58.

Ring gear 58 may be optionally provided with a first end 20 for receiving reaction bar 22. However, other types of rotation-limiting fixtures may be attached to the body at various points to achieve the same result. As shown in FIGS. 2 and 3, ring gear 58 is adapted about its circumference to receive cover plate 62 and output shaft plate 64.

It is noted that the drive pins 54–56 are disposed inside drive holes 46–52 and are disposed inside drive holes 66–72 in output shaft plate 64. Drive holes 66–72 have diameters congruent with the diameter of drive pins 54–56. Attached to output shaft plate 64 is second square drive 26.

A bolt 76 representing a plurality of bolts is used to bolt hand tool 10 together. Preferably, eight bolts (not shown) are used, of which, though not required, four bolts extend through cover plate 62 into one end of drive pins 54–56 (two other drive pins not shown) which are tapped to receive the bolts. The remaining four bolts extend through output shaft plate 64 into the other end of drive pins 54–56. As shown in the drawings, eccentric input shaft 12 is in circumferential rolling contact with cover plate 62, but is not rigidly attached thereto. However, output shaft plate 64 is rigidly connected to output shaft 24 (and thus to second square drive 26). As a result of bolts, cover plate 62 at the input end rotates at the same angular velocity as output shaft 24, but cover plate 62 rotates independently of eccentric input shaft 12.

A plurality of O-rings 78–82 as shown in FIG. 3 may be provided to function as seals to retain lubricant and may be made from rubber or plastic. With respect to lubricant, it is preferred that Moly Disulfide lubricant be brushed over all dynamic surfaces prior to assembly of hand tool 10 to reduce friction and facilitate the operation thereof.

In use, as eccentric input shaft 12 is rotated, the camming action of first surface 36 and second surface 38 drives first pinion gear 42 and second pinion gear 44 around ring gear 58 exactly one hundred eighty degrees out of phase, respectively to define a planocentric hypocycloidal motion. As the pinions 42 and 44 rotate, drive pins 54–56 are engaged as drive holes 46–52 rotate with their respective pinion gears 42 and 44. As the drive pins are driven, cover plate 62 and output shaft plate 64 are also driven thereby rotating second square drive 26 of output shaft 24. Reaction bar 22 prevents rotation of the hand tool 10 and is disposed perpendicularly with respect to cover plate 62, but may also be disposed in a parallel plane with respect to cover plate 62 or any other position so long as reaction bar 22 arrests movement of hand tool 10.

To provide a 30:1 gear ratio, a pinion gear having sixty teeth and a ring gear having sixty-two teeth may be employed. The formula to calculate the ratio is, where $N_p$ is the number of teeth in the pinion and $N_g$ is the number of teeth in the ring gear:

$$\text{ratio} = N_p/(N_g - N_p)$$

The foregoing formula is provided by way of illustration for enablement as one method of determining the gear ratio and not as a limitation that the present invention employ gears with discrete teeth, a specific number of teeth or surfaces, or even that the invention require "teeth" at all. The gear ratio is important because it demonstrates a physical advantage of the present invention over the planetary configurations of the prior art, namely, the planocentric hypocycloid arrangement allows approximately one-third of the teeth of the pinion gears to contact the ring gear as compared to a single tooth contacting the ring gear for each planet gear. Therefore, the higher contact percentage of teeth in the present invention allows greater force multiplication, less gear tooth wear, lesser chance for permanent tooth deformation, the ability to withstand overloads of up to 300%, and the ability to withstand shock by distributing shock over more teeth and thus reducing the possibility of tooth failure.

With respect to the fact that the invention does not require "teeth", the concept of the present invention encompasses the use of a planocentric hypocycloid gear design for applications where the input shaft operates at less than one-hundred revolutions per minute. Accordingly, the present invention need not require the use of a pinion and ring gear having discrete tooth, but could also encompass the use of other planocentric hypocycloidal gear design as, for example, currently provided by Sumitomo of Japan. On the other hand various teeth configuration such as involute, Wildhaber (Novikov), etc. may be used. Also consistent with the planocentric hypocycloid gear concept of the present invention is that a single pinion instead of dual pinions could be employed for hand tools requiring an input on a speed of less than ten revolutions per minute. With a single pinion, a single drive pin and a single pinion drive hole, a single output shaft plate drive hole instead of four each may be provided.

Under the calculations provided above, the present invention may use a gear ratio of anywhere between 5:1 and 360:1 for low speed hand tool use of less than one hundred revolutions per minute under input shaft load.

With respect to materials, input shaft 12, pinions 42 and 44 and output shaft 24 may be made from any high tensile gear steel such as 4140, 4340, 52100, Maxell 2B, Maxell 3B or the like. Pinions 42 and 44 may also be hardened by either mild heat treatment or induction, or by pre-hardening methods to achieve a hardness rating of between twenty-eight and thirty-two Rockwell C. However, powder metal may also be used for pinions 42 and 44 and may also be heat treated. Ring gear 58 may be constructed from an 1144 or 1148 forging, or similar material, which, after forging, may be cut internally to form ring gear 58. Similarly, drive pins 54-56 should be made from high tensile gear steel.

The present invention which achieves a 30:1 gear ratio is estimated to weigh approximately fourteen to sixteen pounds when made from steel and comprises eighteen parts. Therefore, the present invention shows a marked improvement over existing planetary designs currently sold accomplishing the same function of a 36:1 gear ratio and weighing approximately sixty-six pounds and employing forty-one parts. It should be noted that it is theoretically possible to produce a two-stage planetary gear design achieving a ratio of 30:1 which would carry certain undesirable characteristics, but such theoretical design would still require 31 parts and weigh an estimated forty-three to fifty pounds.

In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. For example, it is possible that bearings may be provided, namely, an eccentric input shaft bearing, a pinion bearing for each pinion, an eccentric beating, and/or an output shaft beating. Although the bearings are not necessary and are more properly provided in a non-hand tool environment (e.g. applications where the input shaft rotates at greater than one hundred revolutions per minute) under load, the addition of bearings falls within the concept of the present invention. In another example, more than two pinions may be employed, such as three. In this situation, the phase of the pinions is staggered by 360 divided by the number of pinions, or, for three pinions, a 120 degree stagger between the relative phases of rotation of each, and for four pinions a 90 degree stagger between the relative phases of rotation of each. Thus, the breadth and scope of the present invention should not be limited by any of the above-described exemplary embodiments, but should be defined only in accordance with the following claims appended hereto and their equivalents.

What is claimed is:

1. A hand tool for multiplying force comprising:

a one stage planocentric hypocycloid gear assembly having a single eccentric input shaft, a first pinion having a first drive hole adapted to received a first drive pin, said first pinion being disposed on said eccentric input shaft, a ring gear disposed around said first pinion, a first drive pin, a plate having a second drive hole adapted to receive said drive pin, and an output shaft connected to said plate, wherein said plate communicates with said pinion by said drive pin disposed in said first and second drive holes, such that rotation of said eccentric input shaft drives said pinion in a planocentric hypocycloid motion which pinion in turn indirectly drives said plate, by driving said pin which drives said plate, and said output shaft; and wherein said had tool is adapted for operation of said eccentric input shaft at less than 100 revolution per minute under load.

2. The hand tool according to claim 1, further comprising a second pinion disposed on said eccentric input shaft and parallel to said first pinion, said second pinion having a third drive hole in which said drive pin is disposed, wherein said plate communicates with said first and second pinion by said drive pin disposed in said first, second, and third drive holes, such that rotation of said eccentric input shaft drives said first and second pinion in a planocentric hypocycloid motion which first and second pinions in turn drive said plate and said output shaft.

3. The hand tool according to claim 2, further comprising:

said first pinion having a fourth drive hole;

said second pinion having a fifth drive hole;

said plate having a sixth drive hole; and a second drive pin disposed in said fourth, fifth, and sixth drive holes.

4. The hand tool according to claim 1, further comprising a first end adapted to receive a reaction bar.

5. The hand tool according to claim 1, wherein said eccentric input shaft is adapted to receive a square drive from a ratchet wrench.

6. The hand tool according to claim 1, wherein said eccentric input shaft is adapted to receive a spline drive wrench.

7. The hand tool according to claim 1, wherein said output shaft is a square drive.

8. A one stage planocentric hypocycloid gear assembly comprising:

a single eccentric input shaft adapted to operate at less than 100 revolutions per minute;

a first pinion disposed on said eccentric input shaft, said first pinion have a plurality of drive holes;

a second pinion disposed on said eccentric input shaft, said second pinion having a plurality of drive holes;

a ring gear disposed around and engaging said first and second pinions;

an output shaft connected to a plate having four drive holes;

a plurality of drive pins extending from the drive holes in said first pinion, and through said drive holes in said second pinion and said drive holes in said plate of said output shaft, wherein rotation of said eccentric input shaft drives said first and second pinions in a planocentric hypocycloid motion 180 degrees out of phase respectively and drives said output shaft.

9. A one-stage planocentric hypocycloid gear assembly according to claim 8, wherein said plurality of drive holes in said first pinion, said plurality of drive holes in said second pinion, said plurality of said drives holes in said plate, and said plurality of drive pins comprise two.

10. A one-stage planocentric hypocycloid gear assembly according to claim 8, wherein said plurality of drive holes in said first pinion, said plurality of drive holes in said second pinion, said plurality of said drives holes in said plate, and said plurality of drive pins comprise three.

11. A one-stage planocentric hypocycloid gear assembly according to claim 8, wherein said plurality of drive holes in said first pinion, said plurality of drive holes in said second pinion, said plurality of said drives holes in said plate, and said plurality of drive pins comprise four.

12. A one-stage planocentric hypocycloid gear assembly according to claim 8, wherein said plurality of drive holes in said first pinion, said plurality of drive holes in said second pinion, said plurality of said drives holes in said plate, and said plurality of drive pins comprise six.

* * * * *